US007555331B2

(12) United States Patent
Viswanathan

(10) Patent No.: US 7,555,331 B2
(45) Date of Patent: Jun. 30, 2009

(54) METHOD FOR SURGICAL NAVIGATION UTILIZING SCALE-INVARIANT REGISTRATION BETWEEN A NAVIGATION SYSTEM AND A LOCALIZATION SYSTEM

(75) Inventor: Raju R. Viswanathan, St. Louis, MO (US)

(73) Assignee: Stereotaxis, Inc., St. Louis, MO (US)

( * ) Notice: Subject to any disclaimer, the term of this patent is extended or adjusted under 35 U.S.C. 154(b) by 850 days.

(21) Appl. No.: 10/926,782

(22) Filed: Aug. 26, 2004

(65) Prior Publication Data

US 2006/0058646 A1 Mar. 16, 2006

(51) Int. Cl.
*A61B 5/05* (2006.01)
(52) U.S. Cl. ...................... 600/424; 600/407
(58) Field of Classification Search ............. 600/407, 600/424
See application file for complete search history.

(56) References Cited

U.S. PATENT DOCUMENTS

| 6,332,089 | B1* | 12/2001 | Acker et al. | 600/424 |
|---|---|---|---|---|
| 6,468,265 | B1* | 10/2002 | Evans et al. | 606/1 |
| 6,617,111 | B2* | 9/2003 | Nellis et al. | 435/6 |
| 6,618,633 | B1* | 9/2003 | Gooch et al. | 700/59 |
| 6,774,624 | B2* | 8/2004 | Anderson et al. | 324/207.17 |
| 2003/0210407 | A1* | 11/2003 | Xu | 356/611 |
| 2004/0163073 | A1* | 8/2004 | Krzyzanowski et al. | 717/107 |
| 2004/0176931 | A1* | 9/2004 | Wright et al. | 702/189 |
| 2005/0122477 | A1* | 6/2005 | Alster et al. | 351/237 |
| 2006/0149418 | A1* | 7/2006 | Anvari | 700/245 |

OTHER PUBLICATIONS

PCT International Search Report and Written Opinion Dated: Apr. 18, 2007 pp. 10.

* cited by examiner

*Primary Examiner*—Brian Casler
*Assistant Examiner*—James Kish
(74) *Attorney, Agent, or Firm*—Harness, Dickey & Pierce, P.L.C.

(57) ABSTRACT

A system for navigating a medical device through the lumens and cavities in an operating region in a subject, comprising an imaging system for displaying an image of the operating region, including a representation of the distal end of the medical device in the operating region. The system also includes a localization system for determining the position of the medical device in a frame of reference translatable to the displayed image. Finally, the system includes an algorithm for evaluating one or more rotation matrix using a cost function to determine an optimum rotation matrix for performing transformation of a vector in the local frame of the localization system to that of the reference frame of the navigation system. The rotation matrix can then provide a scale invariant transformation or "registration" of the coordinate systems of the localization system and the navigation system. This allows navigation to be performed to a significant extent from the localization system display alone, which avoids the frequent x-ray irradiation that occurs during the use of fluoro imaging for navigation purposes.

46 Claims, 5 Drawing Sheets

METHOD FOR SURGICAL NAVIGATION UTILIZING SCALE-INVARIANT REGISTRATION BETWEEN A NAVIGATION SYSTEM AND A LOCALIZATION SYSTEM

FIELD OF THE INVENTION

This invention relates to a system and methods for interventional medicine, and more generally to navigation and localization systems for directing and controlling movement of medical devices through the body.

BACKGROUND OF THE INVENTION

Interventional medicine is the collection of medical procedures in which access to the site of treatment is made through one of the subject's blood vessels, body cavities or lumens. For example, angioplasty of a coronary artery is most often performed using a catheter which enters the subject's arterial system through a puncture of the femoral artery in the groin area. The procedure is referred to as PTCA, or Percutaneous (through the skin), Transluminal (through the blood vessel), Coronary (in the vessel of the heart), Angioplasty. Other interventional medical procedures include assessment and treatment of tissues on the inner surfaces of the heart (endocardial surfaces) accessed via peripheral veins or arteries, treatment of vascular defects such as cerebral aneurysms, removal of embolic clots and debris from vessels, treatment of tumors via vascular access, endoscopy of the intestinal tract, etc.

Interventional medicine technologies have been applied to manipulation of instruments which contact tissues during surgical procedures, making these procedures more precise, repeatable and less dependent of the device manipulation skills of the physician. Some presently available interventional medical systems for directing and manipulating the distal tip of the medical device by remote actuation use computer assisted navigation and an imaging system for providing imaging of the catheter and blood vessels and tissues. The system may also be configured to include a localization system for determining the position of the catheter or medical device in the localization system's own frame of reference translatable to the displayed image of the imaging system. In the absence of an explicit link between the localization system and the imaging and navigation systems, the localized device data is not readily available to control navigation of the device by computer-controlled means. The present invention provides a method for obtaining a registration between the display of a localization system and a navigation system, and a means for using the display directly to control device navigation.

SUMMARY OF THE INVENTION

According to the principles of the present invention, a system and method are provided for direct control, from the display of a localization system of a navigation system for deploying a catheter or medical device within the body, such that a physician can input a displacement or a target location that may be converted into a global specifications for a navigation system to enable navigation directly from the display of a localization system. The present system and method provide a means for determining and establishing a scale invariant transformation or "registration" of the coordinate systems of a localization system and a navigation system. One embodiment of this method comprises the identification of at least a minimum number of points or anatomical landmarks projected in the localization system display, of which the three dimensional coordinates relative to the navigation system are known and can be used to estimate a transformation between the navigation system coordinates and the coordinates as determined from the localization system display. The system provides for marking or identifying the various points in the localization projection display, and determining the coordinates of these points relative to the display for use in determining distances between the known points. The method of transforming the coordinates of the localization display projection comprises using ratios of the distances (preferably vectors but possibly also scalar magnitudes) in a cost function to determine a rotation matrix for transforming the points in the display of the localization system to the reference frame of the navigation system. The cost function provides a method for evaluating rotation matrices, to determine an optimum rotation matrix that will provide the most accurate transformation between the local coordinate frame and the global coordinate reference frame of the navigation system. The localization system also has the capability of receiving a user input of a displacement vector or a target location through a joystick or touch screen apparatus, and transforming the displacement or location data to enable navigation control through the localization system. This provides the capability for more precise navigation and operation from a remote location, removing the physician from the procedure site and thereby reducing exposure to X-ray radiation. Remote operation also allows a particularly skilled physicians to operate over a broader geographical area.

DETAILED DESCRIPTION OF THE PREFERRED EMBODIMENT

Figure 1:
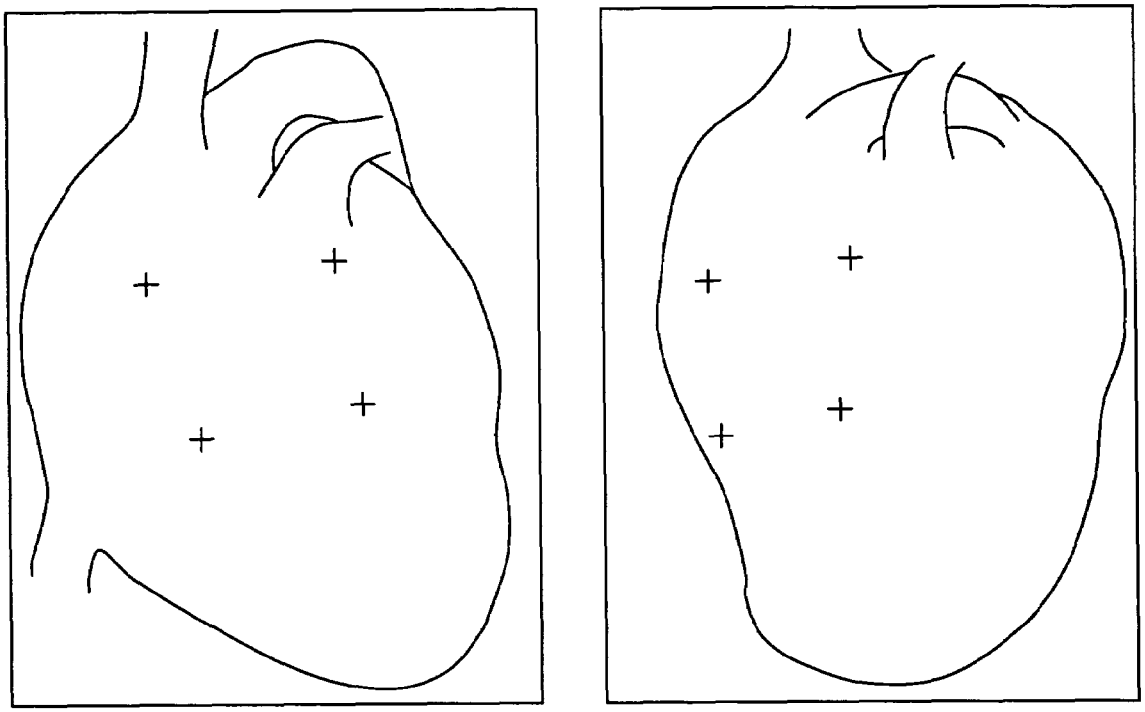
FIG. 1 is an illustration of a biplanar images obtained from an imaging system and displayed on the navigation system, with the two projections used to visualize a medical device guided through the lumens and cavities in the operating regions in a subject in accordance with the principles of this invention.
Figure 2:
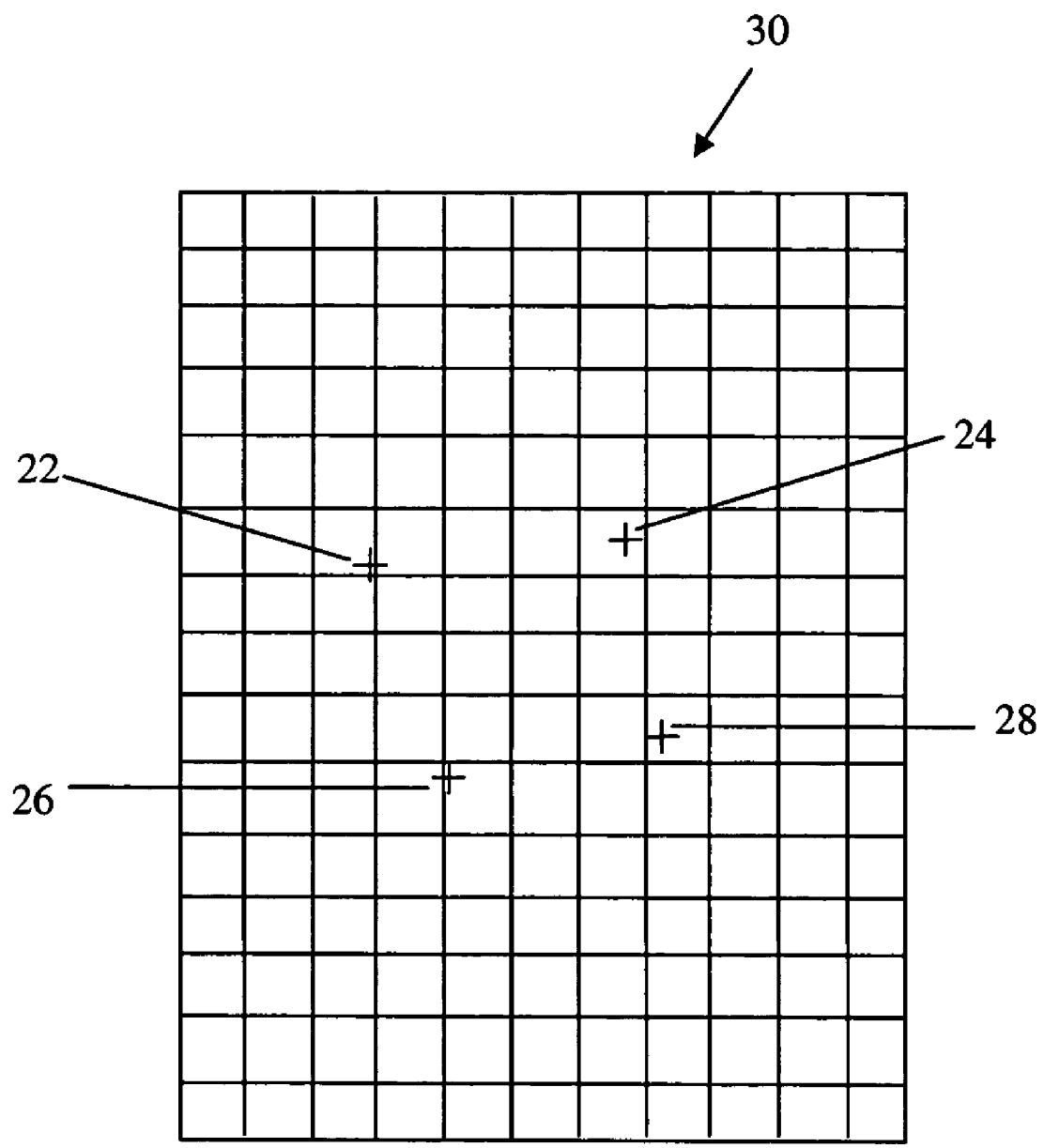
FIG. 2 is an illustration of the localization system display showing a minimum number of known point locations and a coordinate grid within the local frame.

A system for navigating a medical device through the lumens and cavities in an operating region in a subject typically utilizes an elongate medical device, having a proximal end and a distal end adapted to be introduced into an operating region in a subject. The system also connects to an imaging system from which images can be transferred to the navigation system. The navigation system includes a display 20 as shown in FIG. 1 for displaying an image of the operating region, and may include a representation of the distal end of the medical device in the operating region. The imaging system may be an x-ray, MRI, ultrasound, or other imaging system. Most interventional procedures currently use fluoroscopy for imaging of the blood vessels, tissue surfaces, and catheter devices. Dye or contrast agents which absorb X-rays can be injected through the catheter system to obtain a "roadmap" of the vessels or outline of the endocardial surfaces. The medical devices can contain radiopaque materials such as platinum marker bands or polymers loaded with heavy metals to render them visible in the fluoroscopic image. The physician typically views the tissues and the medical device in a single imaging plane, which does not uniquely specify the orientation of the catheter or the direction of tissue targets.

The navigation system's display can be used to assist in navigating the medical device, and may provide two projections which can be used to identify three dimensional coordinates of points on the display. The navigation system display 20 may display anatomical landmarks or various known points within the operating region of the subject, such as points 22, 24, 26 and 28. The imaging planes may be rotated to two or more angles to generate perspective views. Many imaging systems contain two planes of imaging, often configured for orthogonal views. Some modern fluoroscopic systems have the capability to capture images while rotating around the subject. Three dimensional images are then quickly reconstructed by the imaging system. While these images are not quite "real time" because of the time required for rotation and computing, the three dimensional images are most useful for device navigation.

The navigation system can be used with a localization system for providing real time coordinate information of the position of the medical device on a constantly updated localization system display 30, which shows the location and movements of the device. The display 30 of the localization system can be used to locate a plurality of various points or anatomical landmarks that have known three dimensional coordinates as obtained from the navigation system by fluoro-localizing locations using two X-ray images displayed therein. The coordinates of these known points may be read relative to the plane of the localization display. Specifically, an apparatus such as a transparent sheet having a fine grid may be placed over the localization system display, or a commercially available touch screen apparatus configured to mount over the display may be used to read the coordinates of the various points upon suitable identification by a user. The coordinate system of the grid or touch screen apparatus are used to determine coordinates of these various points projected from the display plane. While the scale of the localization system display 30 is generally unknown, a local frame of reference may established to read the coordinates of the points as displayed and determine distances between the points.

Figure 3:
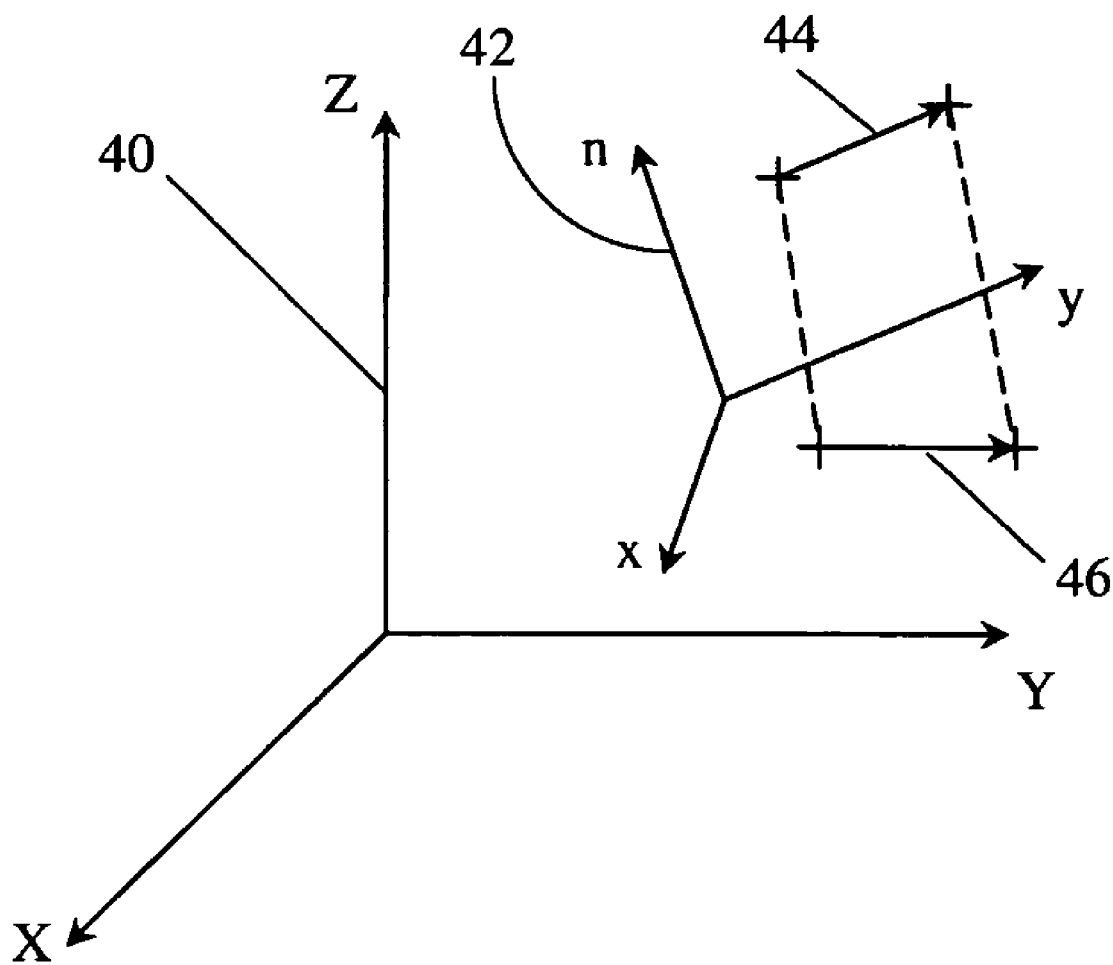
FIG. 3 is an illustration of a vector that is rotated and projected from the coordinate system of the navigation system onto the plane and coordinate system of the localization system display.

A transformation of these points must be made from the local frame of the localization display to the global frame or coordinate system of the navigation system. A vector in one frame may be related to a vector in the other frame by a rotation matrix, which is used in transforming vectors in the global frame to vectors in the local frame. A depiction of a vector 44 in the global coordinate system 40 of the navigation system being projected onto the localization reference frame 42 as vector 46 is shown in FIG. 3. In the system and method of the present invention, a minimum of four known points are required to establish four distance vectors that can be used to determine the three degrees of freedom of a rotation matrix and to exclude dependence on scale. The distance vectors and the rotation matrix can be defined as:

$$\vec{X}_1 = (\vec{X}_B - \vec{X}_A); \vec{X}'_1 = (\vec{X}'_B - \vec{X}'_A)$$

$$\vec{X}_2 = (\vec{X}_C - \vec{X}_B); \vec{X}'_2 = (\vec{X}'_C - \vec{X}'_B)$$

$$\vec{X}_3 = (\vec{X}_D - \vec{X}_C); \vec{X}'_3 = (\vec{X}'_D - \vec{X}'_C)$$

$$\vec{X}_4 = (\vec{X}_A - \vec{X}_D); \vec{X}'_4 = (\vec{X}'_A - \vec{X}'_D) \qquad (1)$$

$$\vec{u}' = PR\vec{u} \qquad (2)$$

where $\vec{u}'$ is a projection in the local frame of vector $\vec{u}$ in the global frame. Thus, $\vec{X}'_1$ ("primed" quantities are defined in the localization display, while "unprimed" quantities are the corresponding quantities defined in the navigation system) would be the projection of the rotated vector $R\vec{x}$. This projected vector generally has local frame components (v, w, 0), and can be written as:

$$\begin{aligned}\vec{x}' &= R\vec{x} - \vec{n}(\vec{n} \cdot R\vec{x}) \\ &= (I - nn^t)R\vec{x}, \text{ or}\end{aligned} \qquad (3)$$

$$\vec{x}' = PR\vec{x} \text{ where } P \equiv (I - nn^t)$$

From the above, three independent ratios of the lengths constructed from the vectors defined in equation (1) can be used to determine the three degrees of freedom associated with the rotation matrix R, and can be defined as:

$$l_1 = \vec{X}'^T_1 \vec{X}'_1 = \vec{X}^T_1 R^T P R \vec{X}_1$$

$$l_2 = \vec{X}'^T_2 \vec{X}'_2 = \vec{X}^T_2 R^T P R \vec{X}_2$$

$$l_3 = \vec{X}'^T_3 \vec{X}'_3 = \vec{X}^T_3 R^T P R \vec{X}_3$$

$$l_4 = \vec{X}'^T_4 \vec{X}'_4 = \vec{X}^T_4 R^T P R \vec{X}_4 \qquad (4)$$

From the above, three independent ratios of the lengths constructed from the vectors defined in equation (4) can be used to determine the three degrees of freedom associated with the rotation matrix R. From these ratios of distances, a cost function can be constructed for defining an error associated with a given rotation matrix, as defined below:

$$C = \left(\frac{l_2}{l_2} - \frac{\vec{x}^T_1 Q \vec{x}_1}{\vec{x}^T_2 Q \vec{x}_2}\right)^2 + \left(\frac{l_2}{l_3} - \frac{\vec{x}^T_2 Q \vec{x}_2}{\vec{x}^T_3 Q \vec{x}_3}\right)^2 + \left(\frac{l_3}{l_4} - \frac{\vec{x}^T_3 Q \vec{x}_3}{\vec{x}^T_4 Q \vec{x}_4}\right)^2 \qquad (5)$$

where $Q = R^T P R$

With the quantities $l_1, l_2, l_3$ and $l_4$ determined from the localization system display, a rotation matrix R can be estimated by minimizing the cost function C in equation (5).

Figure 4A:
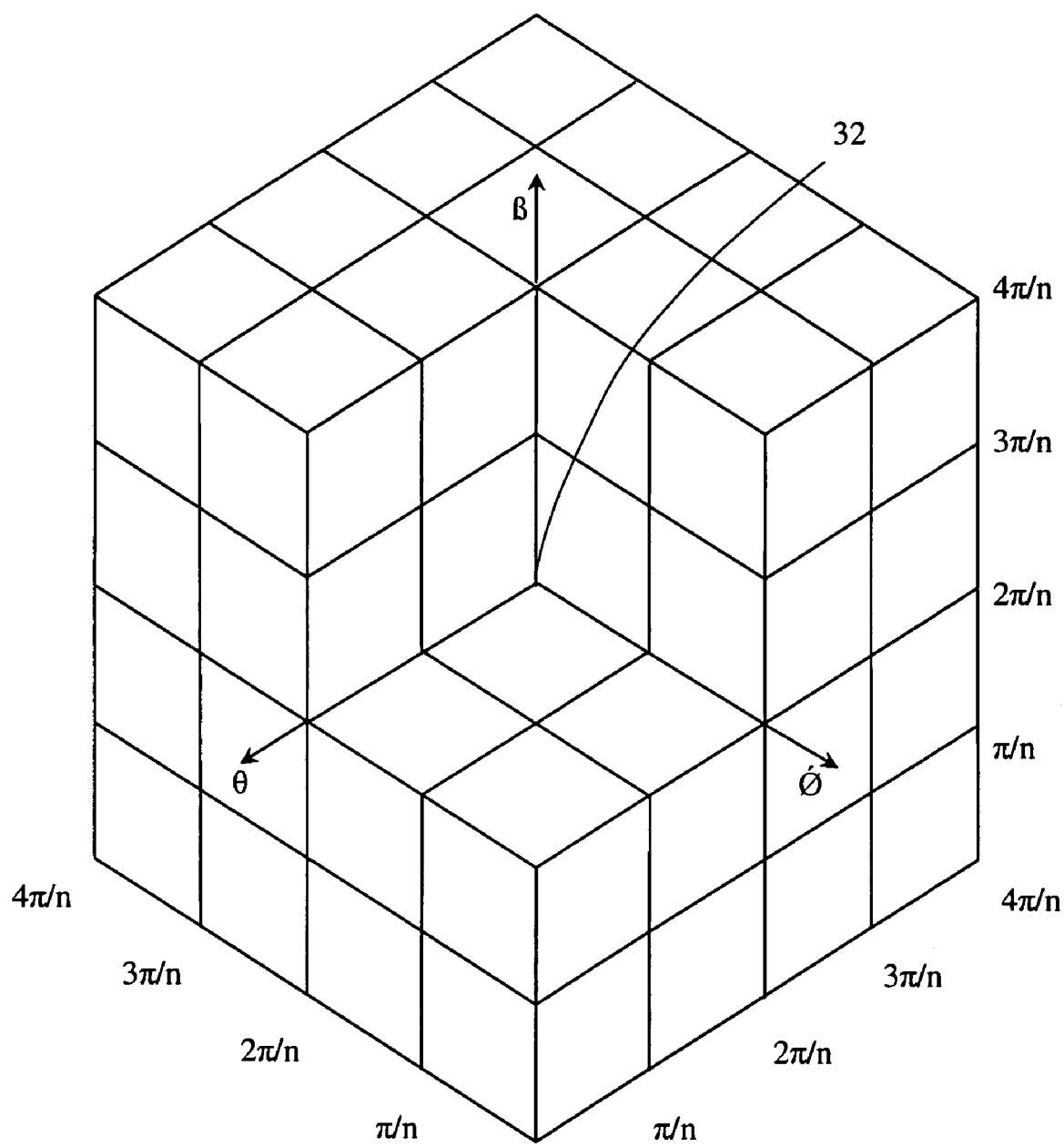
FIG. 4A is an illustration of a grid of predetermined intervals for establishing a plurality of rotation matrix points to be searched for the best choice of a rotation matrix having the least error for transformation of the frame of reference of the localization system to the global frame of reference of the navigation system.
Figure 4B:
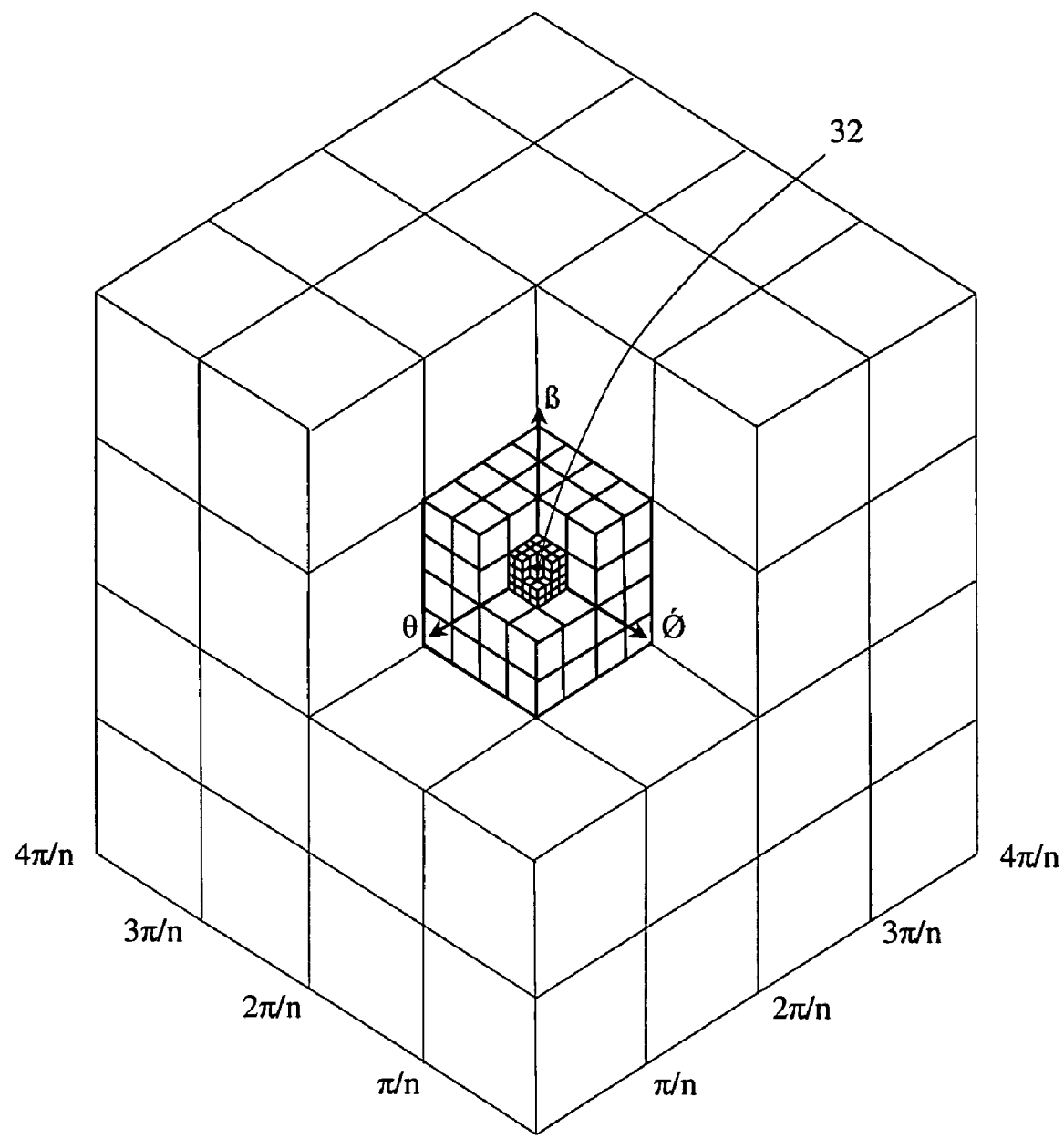
FIG. 4B is an illustration of refined grid for use in further iterations of evaluating and searching rotation matrices with a minimum cost function for linking the frame of reference of the localization system to the global frame of reference of the navigation system.

The cost function provides a method for evaluating rotation matrices that will project or transform a vector between the local frame and the global navigation frame, to determine a rotation matrix that will provide the most accurate projection or transformation of a vector between the local coordinate frame and the global coordinate reference frame of the navigation system. Specifically, the cost function C evaluates each rotation matrix R to find the best R which minimizes C using an algorithm. Since R may be written as a rotation by an angle about an axis, R is completely determined by the angle parameters (ø, θ, β). The algorithm performs a search in (ø, θ, β) space to find the best choice of a rotation matrix point R that minimizes the cost function. The algorithm may optimally perform the search by defining a coarse polar grid that divides ø, θ and β into a predetermined number of intervals or radial slices. In the preferred embodiment, the interval for angles ø and β is preferably a size of $2\pi/20$ radians, and the interval for θ is preferably a size of $\pi/10$ radians. This establishes a semi-spherical region divided into a coarse polar grid, in which C at each point is evaluated to find the point at which C is least. A second polar grid may also be established that comprises interval sizes less that that of the first polar grid, for further evaluation of points to again find the point at which C is least. The point of which the value of C is least is selected and identified as Γ. About this point, a 4×4×4 fine grid may be established as shown in FIG. 4A with the center of the grid 32 encompassing the point Γ. The resolution of this fine grid in the preferred embodiment is preferably a interval of $\pi/80$, and is illustrated in FIG. 4A. It should be noted that the fine grid recited above is only an example, and may alternatively comprise any number of grid intervals or various resolution sizes. The algorithm evaluates each point to again find the point at which the cost function is least, and may subsequently establish a second fine grid and third fine grid as shown in FIG. 4B about the point 34 at which C is least to iteratively determine a rotation matrix that yields a desired resolution or minimum C value. At the n-th step, the resolution is reached in a geometrical progression to yield an accurate resolution in as few steps as possible. In the preferred embodiment, this practice achieves the desired resolution in about three or four steps. From the cost function equation, the algorithm can determine a point at which the rotation matrix minimizes the cost function, and this rotation matrix can be used for transformation between the localization display and the global frame of the navigation system. A corresponding vector in the global or fluoroscopy image system or navigation system reference frame can then be determined from a vector in the localization system. This method provides a means for determining and establishing a scale invariant transformation or "registration" of the coordinate systems of the localization system and the navigation system. Thus, an input means such as a joystick can be used to input a displacement vector based on or mapped to the localization system display, which can then be transformed to navigation system coordinates and provide for control of the navigation system to deploy the medical device to a desired location within the body.

The imaging system, localization system, and navigation system of the system are defined relative to one or more spatial coordinate systems, which must be "registered" to one another within the computer. Fluoroscopic or MRI images form the imaging system are viewed relative to a "tissue" or body coordinate system. When the device is localized relative to the coordinate system of a navigation system, then this coordinate system must be registered to the image coordinate system to properly transform directions defined on the localization display to image coordinates. In this manner, the localization system can be "virtually" registered with the navigation system to enable direct navigation control via the localization system display, while also enabling images of the catheter to be viewed in both the localization and imaging system displays.

Registration as described here can be done in part as a calibration process between known points or anatomical features, of which are non-planar and have known three dimensional coordinates relative to the navigation system reference frame as can be determined for instance by fluoro-localization. Anatomical landmarks or markers fixed to the subject can be used to register a local reference frame, and to serve as references for localization. In some situations it may be useful for the physician to facilitate registration, for example by accessing anatomical landmarks within the subject with a localized medical device that is seen both on a fluoroscopic imaging system and in the localization system display.

The physician interface preferably includes an input device, that allows the physician to input at least a desired destination or a direction. This input means preferably allows the physician to input the desired destination or direction using the display 32 of the imaging system 30. The physician must control the interventional robotic system using a safe and efficient user interface. In the "telemetric" mode, the physician uses hand controls such as a joy stick to move the catheter while observing a real time image of the catheter and tissue. In the "automatic" mode, the physician specifies an end-point or process, and the computer automatically causes the medical device to move. For example, the physician may point and click on an anatomical point on a three dimensional in the tissue image, and the computer would then advance and steer the catheter to the specified point. Alternatively the physician could define a path by a touching and dragging a line or curve on a display screen of a localization system, or touch an anatomical location on the localization display as a target destination for the medical device. In every case, the physician interface allows the doctor to interact with the tissue image to specify device movements, and to observe the subsequent movements of the medical device.

The navigation system provides for manipulating the distal end of the medical device through the body. In one preferred embodiment the navigation system is a magnetic navigation system. The navigation system could alternatively be a mechanically driven system utilizing gears, motors, or cables and wires to shape the distal portion of the medical device, and electrostrictively actuated system, a hydraulic actuation system, or others known to those skilled in the art of actuation. In the case of a magnetic navigation system, the system orients the distal end of the medical device in a selected direction in the operating region through the interaction of externally applied magnetic fields with magnetic materials associated with the medical device inside the operating region, using at least one external source magnet outside the subject's body. The various alternative actuation schemes described here are provided for the purposes of non-limiting illustrative examples only, and a person skilled in the art can choose to construct a system based on the teachings detailed herein and any of a variety of actuation methods as may be convenient for a particular application.

The navigation system could also include an advancer acting on the medical device adjacent the proximal end of the medical device for selectively advancing and retracting the medical device.

The navigation system may comprise an input device such as a computer mouse, a joystick, a hand-held localized stylus, a screen pen or keyboard, or other user input means known to those skilled in the art for receiving at least a destination for the distal end of the device input by the user using the localization system, or a spatial direction input specified by the user, or other device positioning information such as a device deflection direction. A controller, responsive to the destination or direction input provided by the user, operates the navigation system to orient the distal end of the medical device in the proper orientation to reach the input destination or in the appropriate direction, and as the distal end of the medical device moves to its proper orientation, an advancer can be operated either by a user or automatically by the navigation system to advance the distal end to the destination input or direction specified by the user.

It is important to note that cost functions other than the one described here can be used to implement the determination of an optimum best-fit coordinate transformation. Likewise, the successive grid subdivision method described here is for non-limiting illustrative purposes only, and other optimization methods such as gradient-based methods, simplex methods, methods based on neural networks or genetic algorithms, or any of a variety of methods known to those proficient in such mathematical methods can be used to implement the determination of a suitable transformation.

The system includes a computer to manipulate the digital images; add device localization information to the images; interpret physician commands and translate these to suitable device deflection commands; translate information between all relevant coordinate reference frames; could coordinate auxiliary data such as ECG signals used to gate the images; controls the advancer consistent with physician commands and coordinated with steering commands; supply data to the user interface monitors, and receive commands from the user interface. In the "automatic" mode, the computer can drive the catheter to a physician specified end point.

The interventional robotics system of this invention allows the physician to automatically direct the tip of a medical device to points, or along a path or direction, within body lumens or cavities of a subject. The physician interacts with a user interface that sends physician commands to a control computer, and presents the physician with images of tissue in the operating region, including an image of the device. The control computer integrates and registers real time images, pre-operative images, and local images, and commands and coordinates the actions of a device advancer and device tip steering mechanism. The physician can operate remotely from the subject to reduce his exposure to radiation. Exquisite device manipulation skills are not required, and the physician can concentrate his attention on navigation commands and the delivery of therapy.

Once a localization system display is available to view the reat-time location of a device and a navigation system with input from an imaginf system is available, the control algorithm proceeds to: (i) receive inputs of coordinates of a minimum number of points having known coordinates relative to the navigation system from the localization system display, (ii) determine a rotation matrix with the lowest cost function, for transformation of a vector in the localization display reference frame to that of the navigation reference frame, and (iii) perform a mapping of user inputs to control the navigation system in guiding the medical device within the body. This allows navigation to be performed to a significant extent from the localization system display alone, which reduces the frequent x-ray irradiation that occurs during the use of fluoroscopy imaging for navigation purposes.

What is claimed is:

1. A navigation system for navigating the distal end of a medical device in operating region in a subject, the system comprising:
   an orientation system for orienting the distal end of the medical device in the operating region in response to inputs made by a user, the orientation system having an associated display of the operating region in a first coordinate reference frame;
   a localization system for identifying locations in the operating region, the localization system having an associated display of the operating region and a first grid that establishes a second local coordinate reference frame different from the first coordinate reference frame, where the first grid is used to determine the coordinates of points projected from the display plane in the second local coordinate reference frame;
   a control for accepting user inputs of a minimum number of points from the display of the localization system, which points have known three dimensional coordinates from the orientation system's first coordinate frame of reference, the control including an algorithm for determining a transformation matrix for transforming inputs from the display of the localization system in the second local coordinate reference frame to inputs for the orientation system in the first coordinate reference frame;
   wherein the algorithm performs a search in coordinate space to find a rotation matrix point that minimizes a cost function, where the search is performed by subdividing the coordinate space to establish a second grid defining a plurality of points, and the algorithm evaluates the points using a cost function to find a point at which an associated rotation matrix minimizes the cost function, to determine a rotation matrix point that yields a minimum cost function value; and
   wherein the navigation system utilizes the determined rotation matrix to transform a displacement that is input to the localization system display into the navigation system's first coordinate reference frame, to deploy a medical device to a desired location within the subject.

2. The navigation system according to claim 1 wherein the control accepts inputs of locations in the second reference frame from the display of the localization system and transforms them to inputs of locations in the first reference frame.

3. The navigation system according to claim 1 wherein the control accepts inputs of directions in the second reference frame from the display of the localization system and transforms them to inputs of directions in the first reference frame.

4. The navigation system according to claim 1 wherein the control uses a transformation derived from a cost function for evaluating a given rotation matrix that is a function of the ratios of the distances between the points in the first reference frame and distances between the corresponding points in the second reference frame.

5. The navigation system according to claim 4 wherein the ratio of distances is a ratio of distance magnitudes.

6. The navigation system according to claim 4 wherein the ratio of distances is a ratio of distance vectors.

7. The navigation system according to claim 1 wherein the localization system displays a representation of the surfaces in the operating region.

8. The navigation system according to claim 1 wherein the localization system displays a physiologic properties at locations on surfaces in the operating region.

9. A method of registering a display of an information system having first frame of reference with a navigation system having a second frame of reference frame, the method comprising:
   identifying a set of points in an operating region on the display of the information system and a first grid that establishes the first frame of reference, where the first grid is used to determine the coordinates of points projected from the display in the first frame of reference;
   identifying corresponding set of points in the second frame of reference, which corresponding set of points have known three dimensional coordinates in the navigation system's second frame of reference;

determining a transformation between the first frame of reference and the second frame of reference using a rotation matrix that is a function of the ratios of distances among the identified points in the first frame of reference, and corresponding distances among the corresponding points identified in the second frame of reference, wherein the transformation is determined using an algorithm that performs a search in coordinate space to find a rotation matrix point that minimizes a cost function, where the search is performed by subdividing the coordinate space to establish a second grid defining a plurality of points, and the algorithm evaluates the points using a cost function to find a point at which an associated rotation matrix minimizes the cost function, to determine a rotation matrix point that yields a minimum cost function value; and using the determined rotation matrix to transform an input to the display of the information system into coordinates of the navigation system's second frame of reference, which coordinates are used by the navigation system.

10. The method according to claim 9 wherein the step of determining a transformation between the first frame of reference and the second frame of reference comprises finding the transformation using a cost function.

11. The method according to claim 10 wherein the transformation is a rotational transformation associated with a given increment.

12. A method of registering a display of an information system having first frame of reference with a navigation system having a second frame of reference frame, the method comprising:

identifying a set of points in the operating region on the display of the information system in the first frame of reference;

identifying corresponding set of points in the second frame of reference;

determining a transformation between the first frame of reference and the second frame of reference using a rotation matrix that is a function of the ratios of distances among the identified points in the first frame of references, and corresponding distances among the corresponding points identified in the second frame of reference, wherein the transformation is determined using an algorithm, which defines a plurality of points for which associated rotation matrices may be determined, and the step of determining a transformation between the first frame of reference and the second frame of reference comprises finding the transformation using a cost function over a range of values for determining an error associated with a given rotation matrix, in evaluating each rotation matrix to determine the rotation matrix that minimizes the cost function, to thereby identify a rotation matrix that will yield an accurate transformation;

wherein the cost function is a function of at least one transformation variable, and wherein step of determining a transformation between the first frame of reference and the second frame of reference using the cost function comprises evaluating the cost function over a range of values for the at least one transformation variable, taken at a first increment, and subsequently evaluating the cost function over a subset of the range of values taken at a second increment, smaller than the first increment.

13. A method of registering a display of an information system having first frame of reference with a navigation system having a second frame of reference frame, the method comprising:

identifying a set of points in the operating region on the display of the information system in the first frame of reference;

identifying corresponding set of points in the second frame of reference;

determining a transformation between the first frame of reference and the second frame of reference using a rotation matrix that is a function of the ratios of distances among the identified points in the first frame of references, and corresponding distances among the corresponding points identified in the second frame of reference, wherein the transformation is determined using an algorithm, which defines a plurality of points for which associated rotation matrices may be determined, and the step of determining a transformation between the first frame of reference and the second frame of reference comprises finding the transformation using a cost function over a range of values for determining an error associated with a given rotation matrix, in evaluating each rotation matrix to determine the rotation matrix that minimizes the cost function, to thereby identify a rotation matrix that will yield an accurate transformation;

wherein the cost function is a function of at least one transformation variable, and wherein step of determining a transformation between the first frame of reference and the second frame of reference using the cost function comprises an initial evaluation step of evaluating the cost function over a range of values for the at least one transformation variable, taken at a first increment, to determine the transformation that minimizes the cost function, and at least one subsequent refinement step of evaluating the cost function over a range of values for the at least one transformation variable around a previously determined step, at a smaller increment than previously used, to determine the transformation that minimizes the cost function.

14. A method of applying inputs from the display of an information system displaying information from an operating region in a subject utilizing a first frame of reference to a navigation system for orienting medical devices in the operating region in the subject utilizing a second frame of reference, the method comprising:

identifying a set of points in the operating region in the first frame of reference on a display of the information system, where a first grid is used to determine the coordinates of the set of points projected from the display in the first frame of reference, and identifying a corresponding set of points in the second frame of reference, which corresponding set of points have known three dimensional coordinates in the second frame of reference;

selecting a transformation that minimizes the errors in a rotation matrix that is determined as a function of ratios of corresponding distances among the points in each frame of reference using a subdivision method, wherein the transformation is selected by performing a search in coordinate space to find a rotation matrix point that minimizes a cost function, where the search is performed by subdividing the coordinate space to establish a second grid defining a plurality of points, and the points are evaluated using a cost function to find a point at which an associated rotation matrix minimizes the cost function, to determine a rotation matrix point that yields a minimum cost function value; and using the determined rotation matrix in the transformation of an input to the display of the information system into coordinates of the navigation system's second frame of reference, which coordinates are used by the navigation system in orienting medical devices in the operating region.

15. The method according to claim 14 wherein the ratio of corresponding distances is a ratio of distance magnitudes.

16. The method according to claim 14 wherein the ratio of corresponding distances is a ration of distance vectors.

17. A method of controlling a navigation system operating in a first reference frame to orient the distal end of medical device in an operating region in a direction based upon user inputs, to an information system with a display of the operating region using a first grid that establishes a second reference frame, the method comprising:

identifying a set of points in the second reference frame on the information system's display using a first grid, where the first grid is used to determine the coordinates of the set of points projected from the display in the second reference frame, and identifying a set of points in the first reference frame corresponding to the set of points in the second reference frame;

transforming inputs in the second reference frame to the first reference frame using a transformation derived from corresponding points selected in each frame of reference, wherein a transformation is determined by performing a search in coordinate space to find a rotation matrix point that minimizes a cost function, where the search is performed by subdividing the coordinate space to establish a second grid defining a number of points for which associated rotation matrices may be determined as a function of ratios of distances among the selected points, and the points are evaluated using a cost function to find a point at which an associated rotation matrix minimizes the cost function, to determine a rotation matrix point that yields a minimum cost function value; and using the determined transformation including the rotation matrix in transforming an input to the information system into coordinates of the navigation system's first frame of reference that are used by the navigation system in orienting the medical device in the operating region.

18. The method according to claim 17 wherein the transformation is determined using a cost function.

19. The method according to claim 18 wherein the cost function utilizes ratios of distances among corresponding points in each of the reference frames.

20. The method according to claim 17 wherein the ratio of distances is a ratio of distance magnitudes.

21. The method according to claim 17 wherein the ratio of distances is a ration of distance vectors.

22. A method of controlling a navigation system operating in a first reference frame to orient the distal end of medical device in an operating region in a direction based upon user inputs from a system with a display of the operating region in a second reference frame, the method comprising:

transforming inputs in the second reference frame to the first reference frame using a transformation derived from corresponding points selected in each frame of reference, wherein a transformation is determined by defining a number of points for which associated rotation matrices may be determined as a function of ratios of distances among the selected points, and evaluated using a cost function to find a rotation matrix that will yield an accurate transformation, wherein the transformation is determined using a cost function that is minimized using a subdivision method.

23. A system for controlling navigation of a medical device through the lumens and cavities in an operating region in a subject, the system comprising:

a navigation system for orienting the medical device in a selected direction in the operating region in the subject, having a display for displaying images of the operating region in a first coordinate reference frame;

an imaging system for displaying and transferring to the navigation system an image of the operating region;

a localization system for determining the position of the medical device, having a display for showing the position of the medical device;

a marking system for marking locations on a localization system display, the system including a first grid that establishes a second coordinate reference frame, where the first grid is used to determine the coordinates of the marked locations on the display in the second coordinate reference frame;

an input device for defining desired device positioning information with respect to the localization system display as input to the navigation system; and a controller, responsive to inputs by the user of a plurality of location points on the localization system display in the second coordinate reference frame, wherein the controller is configured to determine a transformation, from the second coordinate reference frame to the first coordinate reference frame, using an algorithm which performs a search in coordinate space to find a rotation matrix point that minimizes a cost function, where the search is performed by subdividing the coordinate space to establish a second grid that defines a plurality of points for which associated rotation matrices may be determined as a function of ratios of distances among the marked locations on the display, and uses a cost function over a range of values for determining an error associated with a given rotation matrix, wherein the algorithm evaluates the points using the cost function to find a point at which an associated rotation matrix minimizes the cost function, to determine a rotation matrix point that yields a minimum cost function value; and wherein the controller is configured to perform a transformation of the desired input information to provide control variable information to the navigation system for actuation and control of the distal end of the medical device.

24. The system of claim 23, where the marking system is used to register the localization system display to the navigation system.

25. The system of claim 23, where the desired device positioning information defined is directional information.

26. The system of claim 23, where the desired device positioning information defined is displacement information.

27. The system of claim 23, where the desired device positioning information defined is destination coordinates information for the distal tip of the device.

28. The system of claim 23, where the marking system is based on a touch screen.

29. The system of claim 23, wherein the input device is further capable of input of coordinate information of a minimum number of location points input by the user.

30. The system of claim 29, wherein the controller further utilizes an algorithm for interpreting a minimum number of data point inputs from the user, and responsively determining an optimum transformation of subsequent input of device positioning information for use by the navigation system.

31. The system of claim 30, wherein the algorithm further uses a cost function constructed from ratios of distances between data points, which is used to evaluate one or more rotation matrix for obtaining the optimum rotation matrix with the least cost function value.

32. The system of claim 23, wherein the device positioning information is a specification of device configuration.

33. The system of claim 23, wherein the input device comprises a joystick that enables the user to input device positioning information.

34. The system of claim 23, wherein the input device comprises a computer mouse that enables the user to input device positioning information.

35. The system of claim 23, wherein the input device comprises a localized hand-held stylus that enables the user to input device positioning information.

36. The system of claim 23, wherein the input device comprises a touch screen apparatus on the display of the localization system that enables the user to input device positioning information.

37. The system of claim 23, wherein the device positioning information is a specification of device configuration.

38. A system for controlling navigation of a medical device through the lumens and cavities in an operating region in a subject, the system comprising:
   an elongate medical device, having a proximal end and a distal end adapted to be introduced into the operating region;
   a navigation system for orienting the medical device in a selected direction in the operating region in the subject, and displaying images of the operating region in a first coordinate reference frame;
   an imaging system for displaying and transferring to the navigation system an image of the operating region;
   a localization system for determining the position of the medical device, having a display for showing the position of the medical device, and a first grid that establishes a second local coordinate reference frame, where the first grid is used to determine the coordinates of the set of points projected from the display in the second local coordinate reference frame;
   a marking system for marking locations on the localization system display;
   an input device for defining desired device positioning information with respect to the localization system display as input to the navigation system; and
   a controller, responsive to inputs by the user of a plurality of location points on the localization system display in the second local coordinate reference frame, wherein the controller is configured to determine a transformation, from the second coordinate reference frame to the first coordinate reference frame, using an algorithm that performs a search in coordinate space to find a rotation matrix point that minimizes a cost function, where the search is performed by subdividing the coordinate space to establish a second grid that defines a plurality of points for which associated rotation matrices may be determined as a function of ratios of distances among the marked locations on the display, and uses a cost function over a range of values for determining an error associated with a given rotation matrix, wherein the algorithm evaluates the points using the cost function to find a point at which an associated rotation matrix minimizes the cost function, to determine a rotation matrix point that yields a minimum cost function value; and
   wherein the controller is configured to perform a translation of the desired input information to provide control variable information to the navigation system for actuation and control of the distal end of the medical device.

39. The system of claim 38, where the desired device positioning information defined is directional information.

40. The system of claim 38, where the desired device positioning information defined is displacement information.

41. The system of claim 38, where the desired device positioning information defined is destination coordinates information for the distal tip of the device.

42. The system of claim 38, wherein the control utilizes an algorithm for interpreting a minimum number of data point inputs from the user, and responsively determining an optimum transformation of subsequent input of device positioning information for use by the navigation system.

43. The system of claim 42, wherein the algorithm further uses a cost function constructed from ratios of distances between data points, which is used to evaluate one or more rotation matrix for obtaining the optimum rotation matrix with the least cost function value.

44. A method of controlling a system for navigation of a medical device through an operating region in a subject, comprising a navigation system with a display of at least one image of the operating region, a localization system with a display and a first grid that establishes a second coordinate frame of reference, and an input device for defining desired device positioning information with respect to the localization system display as input to the navigation system, the method comprising the steps of:
   identifying at least a minimum number of points on the image display of the navigation system that have known coordinates within the first coordinate reference frame of the navigation system;
   identifying at least a minimum number of corresponding point locations on the localization display and identifying the coordinates of the corresponding point locations in the second coordinate reference frame, where the first grid is used to determine the coordinates of the corresponding point locations on the localization display in the second coordinate reference frame;
   receiving the input of coordinates in the second coordinate reference frame to the navigation system for each of the known point locations identified on the localization display; and
   using an algorithm that uses the known point location information input into the navigation system to compute a transformation of device positioning information in the second coordinate reference frame into navigation system coordinates in the first coordinate reference frame for controlling the operation of the navigation system, said algorithm performing a search in coordinate space to find a rotation matrix point that minimizes a cost function, where the search is performed by subdividing the coordinate space to establish a second grid that defines a plurality of points for which associated rotation matrices may be determined as a function of ratios of distances among the known point locations, wherein the algorithm evaluates the points using the cost function to find a point at which an associated rotation matrix minimizes the cost function, to determine a rotation matrix point that yields a minimum cost function value; and
   using the determined rotation matrix to transform the desired device positioning information in the second coordinate reference frame into coordinates of the navigation system's first frame of reference, which are used in navigation of the medical device in the operating region.

45. A method of controlling a system for navigation of a medical device through an operating region in a subject, having a navigation system, an imaging system, a localization system with a display and a first grid that establishes a second coordinate reference frame, and an input device for specification of device positioning information relative to the localization display, the method comprising the steps of: identifying a minimum number of points on the imaging system that have known coordinates within the first coordinate reference frame of the navigation system; identifying corresponding point locations on the localization display of the minimum number of points having known coordinates in the first coordinate reference frame; using the first grid to determine the coordinates of the corresponding point locations on the localization display in the second coordinate reference frame; and inputting the coordinates in the second coordinate reference frame into the localization system for each of the known point locations; using an optimization algorithm to determine a rotation matrix that will yield a transformation between the second coordinate reference frame of the localization display and navigation system coordinates, where the optimization algorithm performs a search, in coordinate space to find a rotation matrix point that minimizes a cost function, by subdividing the coordinate space to establish a second grid defining a plurality of points, and the algorithm evaluates the points using a cost function to find a point at which an associated rotation matrix minimizes the cost function, to determine a rotation matrix point that yields a minimum cost function value; and using the determined rotation matrix to transform an input of device positioning information to the localization display in the second coordinate reference frame into coordinates of the navigation system's first frame of reference, which coordinates are used by the navigation system.

46. A system for navigating the distal end of an elongate medical device in an operating region in a subject, the system comprising: an elongate medical device, having a proximal end and a distal end adapted to be inserted into the body; a navigation system for remotely orienting the distal end of the medical device in a selected direction in the operating region; a localization system for determining the position of the medical device having a display and a first grid for establishing a second local coordinate reference frame; an input means of specifying in coordinate information on the navigation system; an input means for specifying coordinate information of a number of points displayed on the localization system display where the first grid is used to determine the coordinates of the number of points on the localization system display in the second local coordinate reference frame; an input means for specifying desired device positioning information; and a control that is configured for: receiving the coordinates of a minimum number of known point locations on the localization display; receiving an input of desired device positioning information in the operating region; wherein the control is configured to use an optimization algorithm to determine a transformation of the device positioning information in the second coordinate reference frame to navigation system coordinates in a first coordinate reference frame, said algorithm performing a search in coordinate space to find a rotation matrix point that minimizes a cost function, where the search is performed by subdividing the coordinate space to establish a second grid defining a plurality of points, said algorithm evaluating the points using a cost function to find a point at which an associated rotation matrix minimizes the cost function, to determine a rotation matrix point that yields a minimum cost function value; and wherein the controller is configured to perform the transformed device positioning data in the second coordinate reference frame to the navigation system first coordinate reference frame to responsively move the medical device to the desired destination.

* * * * *